United States Patent
Zhou et al.

(10) Patent No.: US 7,839,021 B2
(45) Date of Patent: Nov. 23, 2010

(54) MULTIPLEXED DIRECT CURRENT REGULATION OUTPUT CIRCUIT HAVING BALANCE CONTROL CIRCUIT

(75) Inventors: Tong Zhou, Shenzhen (CN); Kun Le, Shenzhen (CN); Huai-Zhu Yan, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 367 days.

(21) Appl. No.: 12/011,697

(22) Filed: Jan. 28, 2008

(65) Prior Publication Data

US 2008/0211312 A1 Sep. 4, 2008

(30) Foreign Application Priority Data

Jan. 29, 2007 (TW) ................ 96103211 A

(51) Int. Cl.
*H02J 1/00* (2006.01)
(52) U.S. Cl. ................ 307/75; 307/66; 363/16
(58) Field of Classification Search ................ 323/267, 323/268, 271–274; 363/15–17, 52, 53, 65, 363/84, 125, 126; 307/31, 35, 39, 130, 66, 307/75, 64
See application file for complete search history.

(56) References Cited

U.S. PATENT DOCUMENTS

| | | | |
|---|---|---|---|
| 6,198,642 B1 * | 3/2001 | Kociecki | ............ 363/37 |
| 6,845,021 B2 | 1/2005 | Kanehira et al. | |
| 6,879,499 B2 | 4/2005 | Matsumoto | |
| 7,170,760 B2 * | 1/2007 | Hsieh et al. | ............ 363/16 |
| 2004/0257838 A1 | 12/2004 | Gan et al. | |

FOREIGN PATENT DOCUMENTS

| | | |
|---|---|---|
| CN | 1533024 A | 9/2004 |
| CN | 1574580 A | 2/2005 |
| JP | 7-226898 A | 8/1995 |

* cited by examiner

*Primary Examiner*—Rajnikant B Patel
(74) *Attorney, Agent, or Firm*—Wei Te Chung

(57) ABSTRACT

An exemplary multiplexed direct current regulation output circuit (2) includes a feedback circuit (22), a sampling circuit (30), a power control chip (21), a first output (27), a second output (28), a first half wave rectifier circuit (23), a second half wave rectifier circuit (24), a first filter circuit (25), a second filter circuit (26), a transformer (20), and a balance control circuit (29). The transformer is configured to provide low voltages to the first output via the first half wave rectifier circuit and the first filter circuit in series, and provide high voltages to the second output via the second half wave rectifier circuit and the second filter circuit in series. The balance control circuit is configured to control a voltage at the second output.

18 Claims, 3 Drawing Sheets

MULTIPLEXED DIRECT CURRENT REGULATION OUTPUT CIRCUIT HAVING BALANCE CONTROL CIRCUIT

FIELD OF THE INVENTION

The present invention relates to a multiplexed direct current regulation output circuit that includes a balance control circuit.

GENERAL BACKGROUND

Multiplexed direct current regulation output circuits are one kind of driving electric source for many types of electronic devices. Multiplexed direct current regulation output circuits have been widely used in various electronic products such as liquid crystal displays, personal computers (PCs), notebooks, and the like. For example, a liquid crystal display generally includes a backlight module, a liquid crystal panel, and a multiplexed direct current regulation output circuit. The multiplexed direct current regulation output circuit includes a high voltage output for driving the backlight module, and a low voltage output for driving the liquid crystal panel.

Referring to FIG. 3, a typical multiplexed direct current regulation output circuit 1 includes a transformer 10, a power control chip 11, a feedback circuit 12, a sampling circuit 19, a first half wave rectifier circuit 13, a second half wave rectifier circuit 14, a first filter circuit 15, a second filter circuit 16, a first output 17, and a second output 18.

The sampling circuit 19 includes a first resistor 191, a second resistor 192, a third resistor 193, and a feedback node 194. One end of each of the first, second and third resistors 191, 192, 193 is connected to the feedback circuit 12 via the feedback node 194. The other end of the first resistor 191 is connected to the first output 17. The other end of the second resistor 192 is connected to the second output 18. The other end of the third resistor 193 is connected to ground. The sampling circuit 19 is configured to sample voltages of the first and second outputs 17, 18. The feedback node 194 is configured to provide a mixed sampling voltage to the feedback circuit 12. When the mixed sampling voltage is equal to 2.5 volts, the feedback circuit 12 does not work. When the mixed sampling voltage is greater than or less than 2.5 volts, the feedback circuit 12 works. The first resistor 191 has a lower resistance, preferably 12 KΩ (kiloohms). The second resistor 192 has a greater resistance, preferably 91 KΩ. The third resistor 193 has a resistance approximately equal to 8 KΩ.

The first half wave rectifier circuit 13 includes a first rectifier diode 132, and a first resistance-capacitance (RC) series circuit 131 connected with the first rectifier diode 132 in parallel. The anode of the first rectifier diode 132 is connected to the transformer 10. The cathode of the first rectifier diode 132 is connected to the first filter circuit 15.

The second half wave rectifier circuit 14 includes a second rectifier diode 142, and a second RC series circuit 141 connected with the second rectifier diode 142 in parallel. The anode of the second rectifier diode 142 is connected to the transformer 10. The cathode of the second rectifier diode 142 is connected to the second filter circuit 16.

The transformer 10 provides voltages to the first output 17 via the first half wave rectifier circuit 13 and the first filter circuit 15 in series, and further provides voltages to the second output 18 via the second half wave rectifier circuit 14 and the second filter circuit 16 in series. The first output 17 is configured to output a low direct current voltage, e.g., 5 volts. The second output 18 is configured to output a high direct current voltage, e.g., 18 volts.

The feedback circuit 12 is configured to provide changes in the mixed sampling voltage of the sampling circuit 19 to the power control chip 11. The power control chip 11 is configured to adjust a pulse duty ratio provided to the transformer 10 according to each change in the mixed sampling voltage, so as to adjust the output of the transformer 10.

When the multiplexed direct current regulation output circuit 1 is used in a liquid crystal display, the first output 17 provides the 5 volt voltage to a liquid crystal panel driving circuit of the liquid crystal display, and the second output 18 provides the 18 volt voltage to a backlight driving circuit of the liquid crystal display.

When the liquid crystal display is turned on, the first output 17 is loaded by the liquid crystal panel driving circuit. Thus, the voltage at the first output 17 drops to approximately 4.3 volts. Moreover, a voltage difference between the anode and the cathode of the first rectifier diode 132 rises slightly, such that the voltage at the first output 17 further drops to approximately 4 volts. At the same time, because the backlight driving circuit is not yet turned on, the second output 18 is not loaded. Therefore the 18 volt voltage at the second output 18 is maintained.

Because the voltage at the first output 17 drops to 4 volts, a current flowing through the first resistor 191 is decreased, while a current flowing through the second resistor 192 remains the same. According to Kirchhoff's electrical current law, a current flowing through the third resistor 193 is decreased, such that the mixed sampling voltage is decreased below 2.5 volts. In such case, the voltage provided from the feedback circuit 12 to the power control chip 11 is decreased, such that the power control chip 11 increases the pulse duty ratio provided to the transformer 10. Thus the voltages at the first output 17 and the second output 18 are increased.

When the voltage at the first output 17 is increased to 4.5 volts, the voltage at the second output 18 is increased to 28 volts, and thus the currents flowing through the first resistor 191 and the second resistor 192 are increased. Accordingly, the current flowing through the third resistor 193 is increased, and the mixed sampling voltage at the feedback node 194 is increased to 2.5 volts, which makes the feedback circuit 12 stop working. However, the voltage at the first output 17 is only 4.5 volts, which is less than the working voltage of 5 volts needed for the liquid crystal panel driving circuit. Therefore the liquid crystal display employing the multiplexed direct current regulation output circuit 1 may not work normally. Thus, the multiplexed direct current regulation output circuit 1 may have low reliability.

What is needed, therefore, is a multiplexed direct current regulation output circuit that can overcome the above-described deficiencies.

SUMMARY

In one preferred embodiment, a multiplexed direct current regulation output circuit includes a feedback circuit, a sampling circuit, a power control chip, a first output, a second output, a first half wave rectifier circuit, a second half wave rectifier circuit, a first filter circuit, a second filter circuit, a transformer, and a balance control circuit. The transformer is configured to provide low voltages to the first output via the first half wave rectifier circuit and the first filter circuit in series, and provide high voltages to the second output via the second half wave rectifier circuit and the second filter circuit in series. The balance control circuit is configured to control a voltage at the second output. The sampling circuit is configured to sample voltages of the first and second outputs and provide the sampling voltages to the feedback circuit. The feedback circuit is configured to selectively provide the sampling voltages to the power control chip. The power control chip is configured to adjust a pulse duty ratio of the transformer according to the received sampling voltages and thereby adjust the voltages at the first and second outputs.

Other novel features and advantages will become more apparent from the following detailed description when taken in conjunction with the accompanying drawings.

DETAILED DESCRIPTION OF PREFERRED EMBODIMENTS

Figure 1:
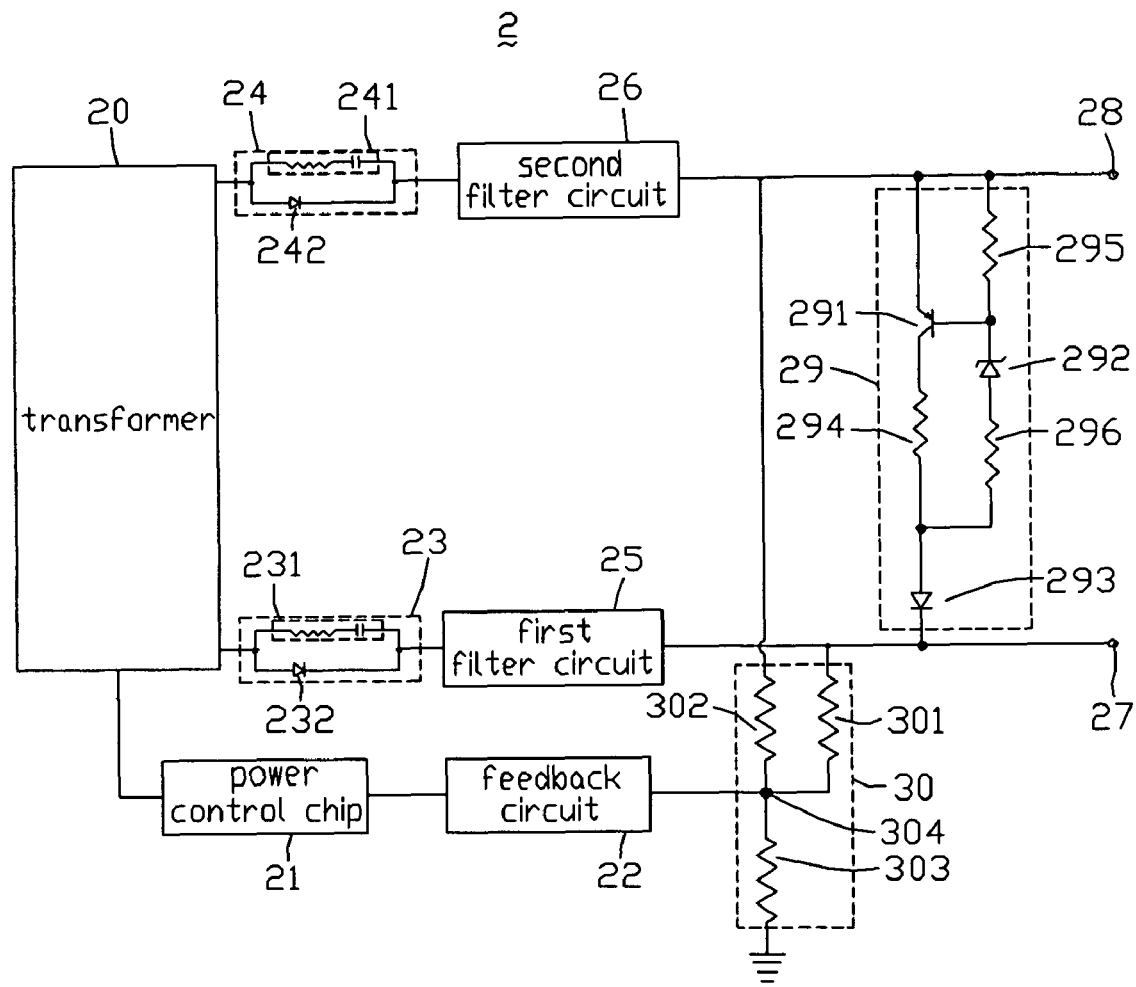
FIG. 1 is a diagram of a multiplexed direct current regulation output circuit according to an exemplary embodiment of the present invention.

Referring to FIG. 1, a multiplexed direct current regulation output circuit 2 according to an exemplary embodiment of the present invention is shown. For simplicity, the multiplexed direct current regulation output circuit 2 is described and shown as having two outputs only. However, other variations with three or more outputs can be configured correspondingly.

The multiplexed direct current regulation output circuit 2 includes a transformer 20, a sampling circuit 30, a power control chip 21, a feedback circuit 22, a first half wave rectifier circuit 23, a second half wave rectifier circuit 24, a first filter circuit 25, a second filter circuit 26, a first output 27, a second output 28, and a balance control circuit 29.

The sampling circuit 30 includes a first resistor 301, a second resistor 302, a third resistor 303, and a feedback node 304. One end of each of the first, second and third resistors 301, 302, 303 is connected to the feedback circuit 22 via the feedback node 304. The other end of the first resistor 301 is connected to the first output 27. The other end of the second resistor 302 is connected to the second output 28. The other end of the third resistor 303 is connected to ground. The sampling circuit 30 is configured to sample voltages of the first and second outputs 27, 28, and provide sampling voltages to the feedback circuit 22. The feedback node 304 is configured to provide a mixed sampling voltage to the feedback circuit 22. When the mixed sampling voltage is equal to 2.5 volts, the feedback circuit 22 does not work. When the mixed sampling voltage is greater than or less than 2.5 volts, the feedback circuit 22 works. The first resistor 301 has a smaller resistance, preferably 12 KΩ. The second resistor 302 has a greater resistance, preferably 91 KΩ. The third resistor 303 has a resistance approximately equal to 8 KΩ.

The first half wave rectifier circuit 23 includes a first rectifier diode 232, and a first RC series circuit 231 connected with the first rectifier diode 232 in parallel. The anode of the first rectifier diode 232 is connected to the transformer 20. The cathode of the first rectifier diode 232 is connected to the first filter circuit 25. The first filter circuit 25 can be a π-type filter circuit. The first rectifier diode 232 can be a germanium diode, a silicon diode, or a gallium arsenide diode.

The second half wave rectifier circuit 24 includes a second rectifier diode 242, and a second RC series circuit 241 connected with the second rectifier diode 242 in parallel. The anode of the second rectifier diode 242 is connected to the transformer 20. The cathode of the second rectifier diode 242 is connected to the second filter circuit 26. The second filter circuit 26 can be a π-type filter circuit. The second rectifier diode 242 can be a germanium diode, a silicon diode, or a gallium arsenide diode.

The balance control circuit 29 includes a positive-negative-positive (PNP) type transistor 291, a clamping diode 292, a diode 293, a balance resistor 294, a first bias resistor 295, and a second bias resistor 296. The first bias resistor 295, the clamping diode 292, the second bias resistor 296, and the diode 293 are connected in series between the first output 27 and the second output 28. A node between the cathode of the clamping diode 292 and the first bias resistor 295 is connected to the base of the transistor 291. The emitter of the transistor 291 is connected to the second output 28. The collector of the transistor 291 is connected to the first output 27 via the balance resistor 294 and the anode and cathode of the diode 293 in series. The balance resistor 294 serves as a load connected to the second output 28 when the voltage at the second output 28 quickly increases, thus preventing too high a current from flowing through the transistor 291. The diode 293 is used to prevent a current from suddenly flowing back to a load connected to the second output 28. Resistances of the first bias resistor 295 and the second bias resistor 296 are both equal to 100 ohms. A resistance of the balance resistor 294 is equal to 200 ohms.

The transformer 20 provides voltages to the first output 27 via the first half wave rectifier circuit 23 and the first filter circuit 25 in series, and further provides voltages to the second output 28 via the second half wave rectifier circuit 24 and the second filter circuit 26 in series. The first output 27 is configured to output a low direct current voltage, e.g., 5 volts. The second output 28 is configured to output a high direct current voltage, e.g., 18 volts.

The feedback circuit 22 is configured to provide changes in the mixed sampling voltage of the sampling circuit 30 to the power control chip 21. The power control chip 21 is configured to adjust a pulse duty ratio provided to the transformer 20 according to each change in the mixed sampling voltage, so as to adjust the output of the transformer 20.

When the multiplexed direct current regulation output circuit 2 is used in a liquid crystal display, the first output 27 provides the 5 volt voltage to a liquid crystal panel driving circuit of the liquid crystal display, and the second output 28 provides the 18 volt voltage to a backlight driving circuit of the liquid crystal display.

When the liquid crystal display is turned on, the first output 27 is loaded by the liquid crystal panel driving circuit. Thus, the voltage at the first output 27 drops to approximately 4.3 volts. Moreover, a voltage difference between the anode and the cathode of the first rectifier diode 232 rises slightly, such that the voltage at the first output 27 further drops to approximately 4 volts. At the same time, because the backlight driving circuit is not yet turned on, the second output 28 is not loaded. Therefore the 18 volt voltage at the second output 28 is maintained.

Because the voltage at the first output 27 drops to 4 volts, a current flowing through the first resistor 301 decreases, while a current flowing through the second resistor 302 remains the same. According to Kirchhoff's electrical current law, a current flowing through the third resistor 303 decreases, such that the mixed sampling voltage decreases below 2.5 volts. In such case, the voltage provided from the feedback circuit 22 to the power control chip 21 decreases, such that the power control chip 21 increases the pulse duty ratio provided to the transformer 20. Thus the voltages at the first output 27 and the second output 28 are increased.

When the voltage at the second output 28 increases to a certain high value, e.g., 21 volts, a voltage applied to the clamping diode 292 is greater than a breakdown reverse voltage of the clamping diode 292. Therefore the clamping diode 292 reversely conducts current, and a voltage at the base of the transistor 291 is maintained at a predetermined value. When the voltage at the second output 28 further increases to approximately 22 volts, an absolute value of a voltage difference Veb between the base and the emitter of the transistor 291 is greater than 0.6 volts. Therefore the transistor 291 is switched on, and the balance resistor 294 serves as a load connected to the second output 28. This load makes the output voltage of the second output 28 drop to approximately 18 volts.

The voltage at the first output 27 increases to approximately 4.5 volts, which is less than 5 volts. Therefore, the mixed sampling voltage at the feedback node 304 is less than 2.5 volts. The power control chip 21 further increases the pulse duty ratio provided to the transformer 20 so as to further increase the voltage at the first output 27 to 5 volts. Due to the balance control circuit 29, the voltage at the second output 28 is maintained at approximately 18 volts. Thus, the first and second outputs 27, 28 cooperatively drive the liquid crystal display such that the liquid crystal display works normally.

Unlike a conventional multiplexed direct current regulation output circuit, the multiplexed direct current regulation output circuit 2 further includes the balance control circuit 29. When the voltage at the second output 28 quickly increases, the balance control circuit 29 can reduce the increased voltage at the second output 28, and make the voltages at the first output 27 and the second output 28 recover to a state of equilibrium. Therefore, the multiplexed direct current regulation output circuit 2 has high reliability. Furthermore, the diode 293 is configured to prevent a current from suddenly flowing back to the load connected to the second output 28, which further enhances the reliability of the multiplexed direct current regulation output circuit 2.

Figure 2:
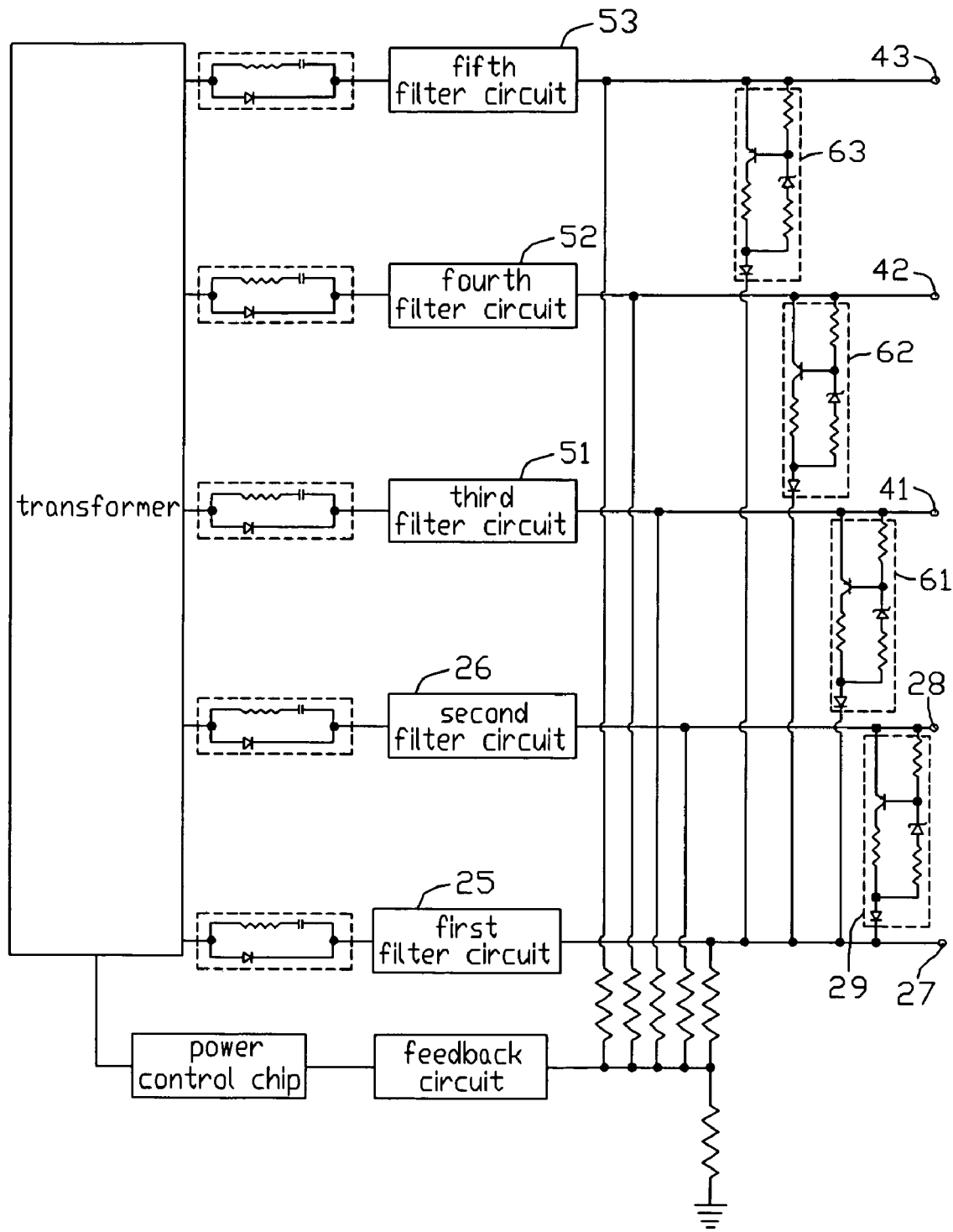
FIG. 2 is a diagram of a multiplexed direct current regulation output circuit according to an alternative embodiment of the present invention.
Figure 3:
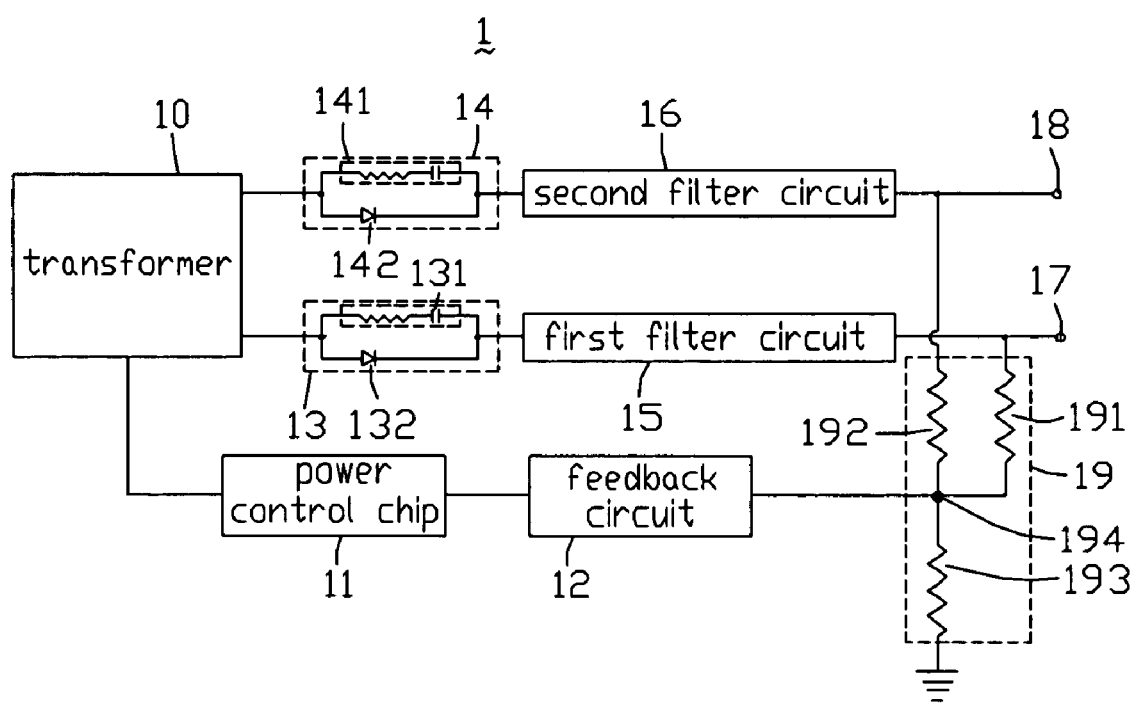
FIG. 3 is a diagram of a conventional multiplexed direct current regulation output circuit.

Further or alternative embodiments may include the following. Referring to FIG. 2, in a first example, the multiplexed direct current regulation output circuit 2 can further comprise a third output 41, a fourth output 42, and a fifth output 43. In such case, the third, fourth and fifth outputs 41, 42, 43 are connected to a third, fourth and fifth filter circuit 51, 52, 53, respectively. Further, the third, fourth and fifth outputs 41, 42, 43 are connected to the first output 27 via a second, third and fourth balance control circuit 61, 62, 63, respectively. The second, third and fourth balance control circuits 61, 62, 63 are configured to control voltages at the third, fourth and fifth outputs 41, 42, 43 respectively. In a second example, the PNP type transistor 291 can be replaced by a p-channel depletion mode metal-oxide-semiconductor field-effect-transistor (MOSFET).

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A multiplexed direct current regulation output circuit comprising a feedback circuit, a sampling circuit, a power control chip, a first output, a second output, a first half wave rectifier circuit, a second half wave rectifier circuit, a first filter circuit, a second filter circuit, a transformer, and a balance control circuit, the transformer configured to provide low voltages to the first output via the first half wave rectifier circuit and the first filter circuit in series, and provide high voltages to the second output via the second half wave rectifier circuit and the second filter circuit in series, the balance control circuit configured to control a voltage at the second output, the sampling circuit configured to sample voltages of the first and second outputs and provide the sampling voltages to the feedback circuit, the feedback circuit configured to selectively provide the sampling voltages to the power control chip, and the power control chip configured to adjust a pulse duty ratio of the transformer according to the received sampling voltages and thereby adjust the voltages at the first and second outputs;

wherein the balance control circuit comprises a transistor, a clamping diode, a first bias resistor, a second bias resistor, and a balance resistor, the first bias resistor, the clamping diode, and the second bias resistor being connected in series between the first output and the second output, a node between the cathode of the clamping diode and the first bias resistor being connected to the base of the transistor, the emitter of the transistor being connected to the second output, and the collector of the transistor being connected to the first output via the balance resistor.

2. The multiplexed direct current regulation output circuit of claim 1, wherein the balance control circuit further comprises a diode, the collector of the transistor being connected to the first output via the balance resistor and the anode and cathode of the diode in series.

3. The multiplexed direct current regulation output circuit of claim 1, wherein the transistor is one of a positive-negative-positive type transistor and a p-channel depletion mode metal-oxide-semiconductor field-effect-transistor.

4. The multiplexed direct current regulation output circuit of claim 1, wherein a resistance of the balance resistor is approximately equal to 100 ohms.

5. The multiplexed direct current regulation output circuit of claim 1, wherein a resistance of the first bias resistor is approximately equal to 200 ohms, and a resistance of the second bias resistor is approximately equal to 200 ohms.

6. The multiplexed direct current regulation output circuit of claim 1, wherein the first filter circuit and the second filter circuit are π-type filter circuits.

7. The multiplexed direct current regulation output circuit of claim 1, wherein the first half wave rectifier circuit comprises a first rectifier diode and a first resistance-capacitance (RC) series circuit connected with the first rectifier diode in parallel, and the second half wave rectifier circuit comprises a second rectifier diode and a second RC series circuit connected with the second rectifier diode in parallel, the anodes of the first and second rectifier diodes being connected to the transformer, the cathode of the first rectifier diode being connected to the first filter circuit, and the cathode of the second rectifier diode being connected to the second filter circuit.

8. The multiplexed direct current regulation output circuit of claim 7, wherein each of the first and second rectifier diodes is selected from the group consisting of a germanium diode, a silicon diode, and a gallium arsenide diode.

9. The multiplexed direct current regulation output circuit of claim 1, wherein the sampling circuit comprises a first resistor, a second resistor, a third resistor, and a feedback node, one end of each of the first, second and third resistors being connected to the feedback circuit via the feedback node, the other end of the first resistor being connected to the first output, the other end of the second resistor being connected to the second output, and the other end of the third resistor being connected to ground.

10. The multiplexed direct current regulation output circuit of claim 7, wherein a resistance of the first resistor is approximately equal to 12 kiloohms, a resistance of the second resistor is approximately equal to 91 kiloohms, and a resistance of the third resistor is approximately equal to 8 kiloohms.

11. The multiplexed direct current regulation output circuit of claim 1, further comprising a third output, a fourth output, and a fifth output, and a second balance control circuit, a third balance control circuit, and a fourth balance control circuit, each of the third, fourth and fifth outputs being connected to the first output via the second, third and fourth balance control circuits respectively, the second, third and fourth balance control circuits configured to control voltages at the third, fourth and fifth outputs respectively.

12. A multiplexed direct current regulation output circuit comprising a transformer, a first half wave rectifier circuit, a second half wave rectifier circuit, a first filter circuit, a second filter circuit, a first output, a second output, and a balance control circuit, the transformer configured to provide high voltages to the first output via the first half wave rectifier circuit and the first filter circuit in series, and provide low voltages to the second output via the second half wave rectifier circuit and the second filter circuit in series, the balance control circuit connected between the first output and the second output and configured to control a voltage at the second output;

wherein the balance control circuit comprises a transistor, a clamping diode, a first bias resistor, a second bias resistor, and a balance resistor, the first bias resistor, the clamping diode, and the second bias resistor being connected in series between the first output and the second output, a node between the cathode of the clamping diode and the first bias resistor being connected to the base of the transistor, the emitter of the transistor being connected to the second output, and the collector of the transistor being connected to the first output via the balance resistor.

13. The multiplexed direct current regulation output circuit of claim 12, wherein the balance control circuit further comprises a diode, the collector of the transistor being connected to the first output via the balance resistor and the anode and cathode of the diode in series.

14. The multiplexed direct current regulation output circuit of claim 12, wherein the first half wave rectifier circuit comprises a first rectifier diode and a first resistance-capacitance (RC) series circuit connected with the first rectifier diode in parallel, and the second half wave rectifier circuit comprises a second rectifier diode and a second RC series circuit connected with the second rectifier diode in parallel, the anodes of the first and second rectifier diodes both being connected to the transformer, the cathode of the first rectifier diode being connected to the first filter circuit, and the cathode of the second rectifier diode being connected to the second filter circuit.

15. The multiplexed direct current regulation output circuit of claim 12, further comprising a sampling circuit, a feedback circuit, and a power control chip, wherein the sampling circuit is configured to sample voltages of the first and second outputs and provide the sampling voltages to the feedback circuit, the feedback circuit is configured to selectively provide the sampling voltages to the power control chip, and the power control chip is configured to adjust a pulse duty ratio of the transformer according to the received sampling voltages and thereby adjust the voltages at the first and second outputs.

16. The multiplexed direct current regulation output circuit of claim 15, wherein the sampling circuit comprises a first resistor, a second resistor, a third resistor, and a feedback node, one end of each of the first, second and third resistors being connected to the feedback circuit via the feedback node, the other end of the first resistor being connected to the first output, the other end of the second resistor being connected to the second output, and the other end of the third resistor being connected to ground.

17. The multiplexed direct current regulation output circuit of claim 12, further comprising a third output, a fourth output, and a fifth output, and a second balance control circuit, a third balance control circuit, and a fourth balance control circuit, each of the third, fourth and fifth outputs being connected to the first output via the second, third and fourth balance control circuits respectively, the second, third and fourth balance control circuits configured to control voltages at the third, fourth and fifth outputs respectively.

18. A multiplexed direct current regulation output circuit comprising a feedback circuit, a sampling circuit, a power control chip, a first output, a second output, a first half wave rectifier circuit, a second half wave rectifier circuit, a first filter circuit, a second filter circuit, a transformer, and a balance control circuit, the transformer configured to provide low voltages to the first output via the first half wave rectifier circuit and the first filter circuit in series, and provide high voltages to the second output via the second half wave rectifier circuit and the second filter circuit in series, the balance control circuit configured to control a voltage at the second output, the sampling circuit configured to sample voltages of the first and second outputs and provide the sampling voltages to the feedback circuit, the feedback circuit configured to selectively provide the sampling voltages to the power control chip, and the power control chip configured to adjust a pulse duty ratio of the transformer according to the received sampling voltages and thereby adjust the voltages at the first and second outputs, wherein the sampling circuit comprises a first resistor, a second resistor, a third resistor, and a feedback node, one end of each of the first, second and third resistors being connected to the feedback circuit via the feedback node, the other end of the first resistor being connected to the first output, the other end of the second resistor being connected to the second output, and the other end of the third resistor being connected to ground.

* * * * *